July 19, 1960 M. A. COLER 2,945,825

CONDUCTIVE PLASTIC STRUCTURE

Filed Oct. 21, 1957

INVENTOR.
BY MYRON A. COLER
Leonard H. King

United States Patent Office 2,945,825
Patented July 19, 1960

2,945,825

CONDUCTIVE PLASTIC STRUCTURE

Myron A. Coler, 56 Secor Road, Scarsdale, N.Y.

Filed Oct. 21, 1957, Ser. No. 691,364
20 Claims. (Cl. 252—500)

Figure 1:
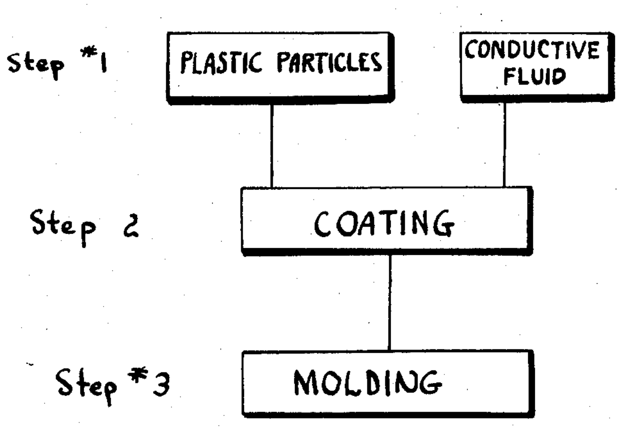

This invention relates to electrically conductive plastic articles and particularly to conductive plastic articles having a reticulated electrically conductive organic fluid compound extending in continuous phase through the body of the plastic and to molding powders for making such articles. By "molding plastic" as used herein is meant any one of a large and varied group of materials which consists of, or contains as an essential ingredient, an organic substance of large molecular weight; and which, while solid in the finished state, at some stage in its manufacture has been or can be formed into shape by flow. This application is a continuation-in-part of my copending application entitled "Anti-Static Plastic Product and Method of Making Same," Serial Number 270,290, filed February 6, 1952, abandoned in favor of the present application.

In general, the conductive plastics of the present invention have electrical specific resistivities in the range of $10^6$ to $10^{12}$ ohm-centimeters. Plastic compositions embodying the present invention are particularly useful in making anti-static molded plastic articles. Moreover, these plastic compositions may be used for a wide variety of other purposes where it is desirable or necessary to have a product which combines moderate conductivity with the desirable properties of the plastics, such as ease of fabrication into intricate shapes, good tensile and mechanical strength, and selected light transmission properties.

Electrically conductive fluids, meeting the requirements stated hereinafter, which are also transparent and colorless, are particularly useful in producing transparent and translucent electrically conductive plastic articles. Such transparent plastic articles may serve as windows for electrical instruments with the advantage that they cannot become electrostatically charged and thereby affect the operation of the instrument. The structure also lends itself to tinting or dyeing to produce colored or optical filter effects while retaining electrically conductive properties.

The articles produced in accordance with this invention may be employed, for example, as a combined solid electrolyte and separator in electrochemical cells of the solid type.

The method of the present invention is based on my discovery that conductive organic fluids may be distributed over the surface of plastic particles of a size suitable for molding rather than being intimately mixed or dispersed in droplets throughout the plastic material and that, if such particles wet with the conductive organic fluid, are molded, a quasi-honeycomb structure of the organic fluid is formed thus providing a multiplicity of conductive paths through the resultant molding. In order to secure this particular structure it is necessary that the plastic and the conductive liquid not be mutually soluble or be present in such quantity that their solubility in each other is exceeded. The fluid should wet the surface of the plastic particles sufficiently well so that it spreads upon the surface without forming minute isolated droplets. The molded article will have a surprisingly high conductivity in relation to the amount of conductive material incorporated therein, and thus by this technique it is possible to produce conductive plastic products having relatively high conductivity coupled with molding characteristics and physical properties substantially the same as those of the untreated plastic. The quantity of conductive material applied is preferably such as to render a major proportion of the surfaces of the plastic particles conductive so as to provide a molding powder which may be formed by conventional molding techniques into any of various desired shapes which are static-dissipating.

The product obtained from the treated molding powders of the present invention should not be confused with prior attempts to produce conductive compositions wherein a large proportion of conductive material is fully dispersed in a plastic binder by such techniques as mixing the conductive compound with a solution of the plastic. Where such complete dispersion of the conductive compound in the plastic is effected there is a tendency for the particles of conductive compound to become imbedded in the plastic, and therefore a relatively large amount of conductive compound must be used to obtain sufficient contact between the particles thereof to secure the desired conductivity; in many cases even an excessive amount fails to result in a conductive product. With the present process, on the other hand, it is possible to achieve conductivity with a small proportion of conductive compound. From a practical standpoint, the relatively high loading of conductive material utilized in the dispersion methods is undesirable since it produces structural weaknesses such as excessive friability and fabricating difficulties; and, in general, an undesirable departure from the physical properties of the untreated plastic will result.

Inherent in the teachings of this invention is the efficient utilization of the conductive material incorporated into the conductive plastic product. This efficiency permits the commercial use of expensive conductive materials; further, the relatively small quantity of conductive material required and the method of incorporation do not undesirably alter the physical properties of the plastic.

Surprisingly, this invention permits the making of a void-free molding having a continuous network of a fluid retained therein. The quantity and nature of the treatment of the plastic particles are such that a material increase in the electrical conductivity of the plastic base is effected without destroying the moldability of the powder. Various theories might be advanced to explain the unexpected phenomenon that plastic particles treated with fluid conductive compounds can still be successfully molded into desired products which exhibit a combination of selected characteristics of plastics and conductors.

Figure 2:
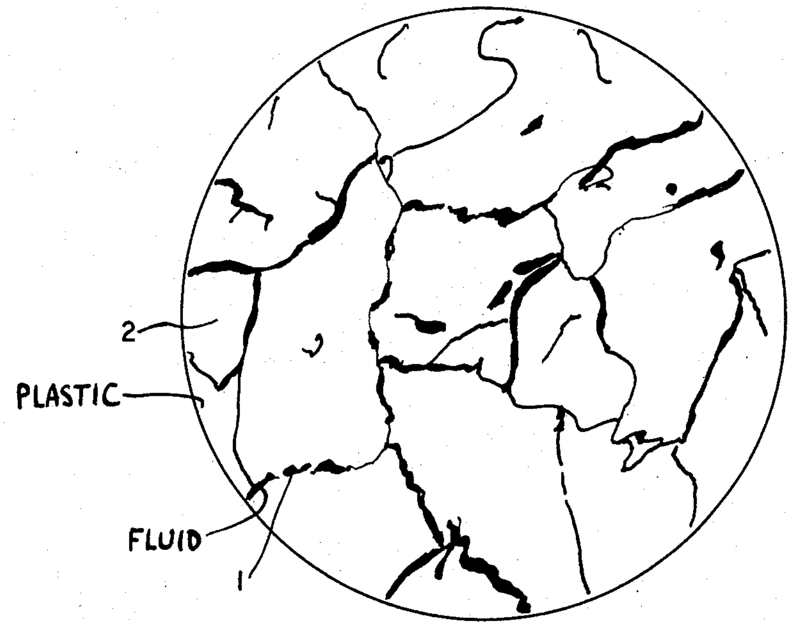

The invention will be disclosed in detail hereinafter with reference to the accompanying drawing wherein Figure 1 represents a flow sheet of the process and Figure 2 represents a drawing of a typically molded product prepared by the present method as a cross-section appears as observed under a microscope using a magnification of about 50 power.

With reference to Figure 1, step 1 represents the preparation of the synthetic resin and conductive organic fluid. The resin for example may be particles of a synthetic resin having a particle size in the range of about 20 to about 325 mesh. This may necessitate comminuting of larger particles by conventional means. Normally ground 40 mesh material is satisfactory as a comparatively small amount of fines can be tolerated. As employed in the examples "20 mesh" means passing 20 mesh.

The plastic powder which can be treated by the process of this invention may be chosen from a large group of plastic molding substances such as phenolformaldehyde, urea formaldehyde, cellulose, acetate, polystyrene and polystyrene based synthetic resins such as copolymers and mixtures of polymers and copolymers of styrene; and polymers, copolymers and mixtures of polymers and copolymers of modified styrenes, such as methyl styrene, in any of which styrene or modified styrene is present in a major portion.

Examples of the above coplymers are styrene-butadiene and styreneacrylonitrile. An example of a polymer mixture, otherwise known as a styrene alloy, is a polymer mixture containing polystyrene, polybutadiene and polyacrylonitrile. Typical of still other suitable suitable plastic molding compositions are the polyethylenes; polypropylenes; polyacrylics, such as polymethyl-, polyethyl-, polybutyl-, and polyethylhexyl-methacrylates, modified acrylics such as halogenated acrylates and polyacrylonitrile; polyamides such as nylons and modified nylons; polybutadienes; polyvinylhalides such as polyvinylidenechloride, polytetrafluoroethylene, polytrifluoromonochloroethylene and polyvinylchloride; and polyvinylacetate.

It is to be understood that compatible mixtures of the resin polymers commonly referred to as plastic alloys, may be employed. The mixture of resins may be accomplished by simple mechanical incorporation, as by extrusion of the polymers or by copolymerization of the monomers.

The plastic particles may already contain compounding ingredients such as lubricants, plasticizers, dyes, and pigments, and fillers like alpha-cellulose, wood flour and mica.

Suitable organic fluids include materials which have a conductivity greater than $1 \times 10^{-8}$ mhos/cm. and are chemically stable under normal molding conditions of the particular plastic employed. Generally speaking this would signify the material is stable at temperatures below 300° F. They are required to have a boiling point of at least 175° F. at 760 min.

Certain fluids, such as for example polyethylene glycols having a molecular weight of about 1500, are semi-solid or grease-like at ordinary temperatures but they exhibit sufficient flow to act as a fluid within the meaning herein intended.

The fluid may be electrically conductive per se as, for example, the materials listed in Table I, or they may be rendered conductive by the addition of ionizable materials or agents causing the fluid to ionize. Certain organic fluids may be rendered conductive by the presence of impurities. In general, suitable materials include ionizable organic compounds and mixtures. The conductivity of such ionizable organic compounds or even of ionizable impurities which may be present can be enhanced by the addition of materials having a high dielectric constant. It is recognized that the presence of water in the conductive liquids described herein may contribute appreciably to conductivity. It is within the contemplation of the present invention to employ all such materials. In carrying out the invention it is essential that the resin and the fluid be mutually non-reactive. Likewise it is essential that the plastic and the fluid be a mutually non-soluble in each other in order to maintain the disclosed structure. Where it is desired to employ a fluid for which a particular plastic exhibits a solvent action, it is necessary that additional fluid be present in the form of the network. For example, polyethylene glycol is often employed in polystyrene compositions as a lubricating agent. The quantity employed is usually in the order of about 0.2%. In carrying out this invention the quantity of additional polyethylene glycol employed to provide conductivity in the structure of this invention would be in excess of the amount directly incorporated in the plastic for mold release or lubrication purposes.

In step 2, the conductive fluid may be applied to the surfaces of the plastic particles in any of various ways but I prefer to use what might be designated as a simple "smearing" technique. I have found that effective cladding of the particles of most plastics can be achieved by carefully tumbling and/or ball milling the powder in physical contact with the conductive fluid. Also it is possible to coat the plastic particles with the conductive fluid by treating them with a solution of the fluid in a suitable volatile solvent and subsequently evaporating the solvent. It is important that the plastic should not be in a condition to encase the conductive fluid and therefore I prefer, where possible, to use a simple mechanical action such as tumbling or ball milling at room temperature to clad the plastic particles with the conductive material.

The term ball milling is used herein in its generic sense to include any milling process carried out in a rotating shell containing the material to be milled and discrete inert articles that assist in the milling operation. The discrete articles are usually steel spheres but may also have other shapes and be made of other inert materials. Moreover, it should be noted that in the present process, the materials are preferably subjected to only a moderate ball milling, that is, the ball milling is carried out in such a way that aggregates of the plastic particles are broken up to thus produce the desired coating of the conductive liquid on the plastic particles, but the milling is not carried out under conditions which would favor the fracture of the plastic particles.

The resulting article will have a quasi-honeycomb structure as shown in Figure 2, where it will be observed that the conductive fluid 1 is present as a reticulated structure or network extending through the article. Moreover, it is apparent that the particles of plastic 2 have been deformed during molding to a sufficient extent to eliminate all voids. In other words, both the organic fluid and the plastic are in the form of a continuous phase extending throughout a void-free article.

The term "quasi-honeycomb" is employed to distinguish the irregular structure of this invention resulting from the deformation of plastic particles during molding from the commonly recognized honeycomb structure formed from uniform hexagonal sections.

In order to point out more fully the nature of the present invention, the following specific examples are given of illustrative methods of preparing conductive plastic products falling within the scope of the present invention. In each case a control was run employing the same plastic without the additive for purposes of direct comparison. After the coating step the product was microscopically examined to make certain that at least a major proportion of the surface of the plastic particles was coated with the fluid.

EXAMPLE 1

A one gallon jar mill was charged with 2000 grams of porcelain balls one inch in diameter, 100 grams of 40 mesh polystyrene beads and 5 grams of N-acetylethanolamine. The mill was turned at 60 revolutions per minute for 4 hours.

The resulting powder was compression molded at 350° F. for 10 minutes in a flat disc mold at 10,000 pounds per square inch and cooled under pressure. Several moldings in various thicknesses were made. The resultant moldings would not attract crushed cigarette ashes after being rubbed vigorously with a wool cloth. The moldings were translucent to transparent depending on thickness.

EXAMPLE 2

The experiment of Example 1 was repeated except that 100 grams of 40 mesh polyvinylchloride were substituted for the polystyrene beads. The resultant moldings discharged a charged electroscope.

EXAMPLE 3

The experiment of Example 1 was repeated using 5 grams of formamide instead of the N-acetylethanolamine.

The resultant molding would not attract crushed cigarette ashes after being rubbed vigorously with a wool cloth.

EXAMPLE 4

The experiment of Example 1 was repeated using 5 grams of glycerol instead of the N-acetylethanolamine. The resultant molding was static dissipating as evidenced by discharging a charged electroscope.

EXAMPLE 5

The experiment of Example 1 was repeated using 5 grams of a 50% water solution of glycolonitrile instead of the N-acetylethanolamine. The resultant molding was static dissipating as determined by the previously employed ash pickup test.

EXAMPLE 6

100 grams of 20 mesh polystyrene beads were mixed in a 500 cc. beaker with 200 grams of a 20% by weight solution of N-acetylethanolamine in ethyl alcohol. The excess was poured off and the beads dried and molded as in Example 1. The resultant molding did not attract crushed cigarette ashes after being rubbed vigorously with a wool cloth.

EXAMPLE 7

The experiment of Example 1 was repeated except that 100 grams of 40 mesh polyvinylidene chloride were substituted for the polystyrene beads. The resultant molding did not acquire a static charge when rubbed vigorously with a wool cloth as determined by the ash pickup test.

EXAMPLE 8

The experiment of Example 1 was repeated except that 100 grams of 20 mesh polymethylmethacrylate were substituted for the polystyrene beads. The resultant molding dissipated static as determined by the ash pickup test.

EXAMPLE 9

25 grams of 20 mesh polyvinyl alcohol (Elvanol 5105, E. I. du Pont de Nemours and Co., Inc.) were mixed in a mortar and pestle with 8 grams of glycerine in which were dissolved 2 grams of sodium bicarbonate. The resultant powder was molded at 300° F. and 2000 p.s.i. for 15 minutes and cooled under pressure. The resultant molding had a specific resistance of 2.5 megohm-centimeters.

EXAMPLE 10

A one gallon jar mill charged with 2000 grams of one inch porcelain balls, 32 grams of glycerine, 8 grams of sodium bicarbonate and 100 grams of 20 mesh polystyrene beads was rotated at 60 r.p.m. for four hours. 25 grams of the resulting powder was compression molded at 350° F. for 10 minutes at 1000 p.s.i. and cooled under pressure. The molding was carried out in a simple cylindrical piston mold so as to produce a round disc having parallel faces.

The disc was assembled into a battery cell by placing a sheet of zinc on one side and a sheet of graphite on the other side. The assembly was held together by a small C clamp with insulating pads between the assembly and the C clamp jaws. An electrostatic voltmeter was connected between the zinc and carbon electrodes. A reading of 1.4 volts was obtained.

EXAMPLE 11

The container of Example 1 was charged with 100 grams of an unmodified, unfilled phenol formaldehyde resin having a particle size ranging between 60 and 80 mesh and 15 grams of benzyl alcohol. The container was rotated at 75 r.p.m. for 10 hours. Under microscopic examination, the particles appeared completely coated by the alcohol.

The particles were molded at 325° F. for 6 minutes at 10,000 p.s.i. and the molded article was removed directly from the hot mold without cooling. After cooling the specimen was found to be capable of discharging an electrostatic recharge electroscope.

EXAMPLE 12

In order to determine the effectiveness of the procedure of this invention, the following test was carried out:

2000 grams of monomeric styrene and 200 grams of polyethylene oxide, having an average molecular weight of approximately 1540 was mixed together. The mix was polymerized by heating for a period of 15 hours at 100° C. to 114° C. The batch was then heated in an oven at 80° C. for one day and then at 140° C. for 5 days. The resulting polystyrene resin was converted to molding material by rolling and grinding operations. The resulting polymerized article showed a maximum loading of polyethylene oxide as evidenced by entrapped globules of the polyethylene oxide.

The resulting product was found to readily become electrostatically charged which charge was retained.

The test for electrostatic charging was vigorous rubbing with a wool cloth. The acquisition of a charge is indicated when the rubbed plastic piece will attract dry finely divided silica at a vertical distance of one inch or more.

When the rubbed plastic piece was brought into contact with the high potential electrode of an electrostatic voltmeter, a charge of more than 300 volts was observed. When a grounded conductor was brought into contact with the charged piece at a distance of approximately 1½ inches from the voltmeter electrode, the charge remained above 300 volts for more than 10 minutes.

What has been demonstrated is that the use of a quantity of polyethylene glycol far in excess of the amount soluble in the plastic fails to provide a conductive product when the fluid is incorporated in the conventional manner.

In order to provide a direct comparison, a second specimen was prepared in accordance with the teachings disclosed herein.

The second specimen was prepared by coating 90 parts of polystyrene granules having a particle size of 80 to 325 mesh with 10 parts of the same polyethylene oxide. The mixture was prepared by heating both the polystyrene and the polyethylene oxide to a temperature above the melting point of polyethylene oxide. The temperature of heating was approximately 60° C. The polystyrene and polyethylene oxide were stirred to reasonable uniformity in a particulate mixture and 30 grams of the mixture were charged to a one gallon cylindrical container carrying 400 grams of ½ inch porcelain balls which had been heated to 60° C. The container was turned at 70 r.p.m. for 30 minutes.

The resulting coated particles were molded at 350° F. and 1600 pounds per square inch pressure.

The molded specimen was uniform in appearance and was found incapable of becoming charged when tested in accordance with the foregoing test.

Still other conductive materials which are suitable for the purposes of this invention either with or without added materials to enhance conductivity are listed in Table I.

This listing is merely by way of example. Reference to the literature provides exhaustive lists of materials, conductivities, and boiling points so that one may readily select fluids falling within the operative limitations. It has also been pointed out that the fluid and plastic be substantially mutually insoluble and non-reactive. To select a combination of materials meeting the latter tests one need only look to the literature of the plastic as extensive work has been done on the effect of fluids on various plastics.

*Table I*

| | |
|---|---|
| Acetamide | Formamide |
| Ethyl acetoacetate | 1,3-propane diol |
| Octyl alcohol | Diethyl oxalate |

The quantity of fluid employed is between 0.1% and 30% by weight of plastic in excess of the quantity of fluid soluble in the plastic. For compression molding the quantity of fluid is preferably in the range of 0.1% to 30% by weight while for injection molding a range of 8% to 30% is preferred.

When injection molding is employed the larger quantity is preferred in order to maintain the fine lacy retriculated structure.

Having thus disclosed my invention;

What I claim is:

1. For use in electrochemical cells, an electrically conductive solid electrolyte member having a specific resistivity between about $10^6$ and $10^{12}$ ohm-centimeters and being substantially free from voids comprising a molded body of a molding plastic having a fine lacy network of electrically conductive organic fluid extending therethrough so as to provide a multiplicity of electrically conductive paths through said molded body, said fluid being characterized by an electrical conductivity in excess of $1\times10^{-8}$ mhos/cm., a vapor pressure less than 760 mm. at 175° C., said plastic and said fluid being mutually substantially insoluble in and chemically non-reactive with the other, said fluid being present in the said fine lacy network of said member to the extent of 0.1% to 50% of the weight of said plastic.

2. An electrically conductive structural member consisting of a void-free molded body of a molding-plastic having a reticulate structure of an electrically conductive organic fluid extending therethrough so as to provide a multiplicity of electrically conductive paths through said body, said fluid being characterized by an electrical conductivity in excess of $1\times10^{-8}$ mhos/cm. and a vapor pressure of less than 760 mm. at 175° C., said plastic and said fluid being mutually substantially insoluble and chemically non-reactive with the other, said fluid being present in said reticulate structure of said member to the extent of 0.1% to 50% of the weight of said plastic said void-free molded body having a specific resistivity between about $10^6$ and $10^{12}$ ohm-centimeters.

3. The member of claim 2 wherein said plastic is polystyrene.

4. The member of claim 2 wherein said plastic is polyethylene.

5. The member of claim 2 wherein said plastic is polyvinylchloride.

6. The member of claim 2 wherein said plastic is polymethylmethacrylate.

7. The member of claim 2 wherein said plastic is polyvinylidene chloride.

8. The member of claim 2 wherein said fluid is formamide.

9. The member of claim 2 wherein said fluid is n-acetylethanolamine.

10. The member of claim 2 wherein said fluid is glycerol.

11. The member of claim 2 wherein said fluid is polyethyleneglycol.

12. The member of claim 2 wherein said fluid is glycerol containing sodium bicarbonate.

13. The process of producing void-free electrically conductive molded plastic articles having a specific resistivity between about $10^6$ and $10^{12}$ ohm-centimeters; consisting of the steps of coating a major proportion of the surface of particles of a molding plastic with from 0.1% to 50% by weight of said plastic in excess of the quantity soluble therein of a conductive organic fluid having a vapor pressure less than 760 mm. at 175° C., an electrical conductivity greater than $1\times10^{-8}$ mhos/cm., said plastic and said fluid being further characterized by being mutually non-reactive with and substantially non-soluble in each other and thereafter consolidating the coated particles directly into a finished molded article wherein the coating comprises a continuous fine lacy network of electrically conductive material distributed so as to provide a multiplicity of electrically conductive paths through said article.

14. The process of claim 13 where said plastic is polystyrene.

15. The process of claim 13 where said plastic is polyvinylchloride.

16. The process of claim 13 where said resin is polymethylmethacrylate.

17. The process of claim 13 where said resin is polyethylene.

18. The process of claim 13 where said resin is polyvinylidene chloride.

19. A molding plastic product, adapted for molding electrically conductive plastic articles which consist essentially of particles of a synthetic resin molding plastic and about 0.1% to 50% of an organic fluid based on the weight of said plastic in excess of the amount of said fluid soluble in said plastic, said fluid being attached to the surfaces of the particles of said plastic and covering a major proportion of said surface, said coated particles being plastically deformable in the usual molding conditions for the plastic used to produce a product substantially free from voids, said fluid being characterized by an electrical conductivity in excess of $1\times10^{-8}$ mhos/cm. and a vapor pressure of less than 760 mm. at 175° C., said plastic and said fluid being mutually substantially insoluble in and chemically non-reactive with the other.

20. The process of producing molded void-free electrically conductive plastic articles consisting of the steps of coating a major proportion of the surface of particles of a molding plastic with from about 0.1% to 50% of the weight of said plastic in excess of that quantity of fluid soluble in said plastic, of a conductive organic fluid having a vapor pressure of less than 760 mm. at 175° C., and an electrical conductivity greater than $1\times10^{-8}$ mhos/cm., said plastic and said fluid being further characterized by being mutually non-reactive with and substantially non-soluble in each other, and molding said coated plastic particles.

References Cited in the file of this patent

UNITED STATES PATENTS

| | | |
|---|---|---|
| 2,056,794 | Macht et al. | Oct. 6, 1936 |
| 2,246,915 | Dangelmajer | June 24, 1941 |
| 2,265,303 | Moss | Dec. 9, 1941 |
| 2,340,866 | Dangelmajer | Feb. 8, 1944 |
| 2,353,228 | Ducca | July 11, 1944 |
| 2,371,868 | Berge et al. | Mar. 20, 1945 |
| 2,448,358 | Dangelmajer | Aug. 31, 1948 |
| 2,525,691 | Lee et al. | Oct. 10, 1950 |
| 2,531,700 | Porter | Nov. 28, 1950 |
| 2,537,644 | Carr | Jan. 9, 1951 |
| 2,624,725 | Bjorksten et al. | Jan. 6, 1953 |
| 2,678,285 | Browning | May 11, 1954 |
| 2,761,849 | Coler | Sept. 4, 1956 |